US012572027B2

(12) United States Patent
Chen et al.

(10) Patent No.: US 12,572,027 B2
(45) Date of Patent: Mar. 10, 2026

(54) DISPLAY DEVICE AND DISPLAY METHOD OF DISPLAY DEVICE

(71) Applicant: WUHAN CHINA STAR OPTOELECTRONICS TECHNOLOGY CO., LTD., Wuhan (CN)

(72) Inventors: Yunni Chen, Wuhan (CN); Fancheng Liu, Wuhan (CN); Guowei Zha, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 616 days.

(21) Appl. No.: 17/925,378

(22) PCT Filed: Nov. 4, 2022

(86) PCT No.: PCT/CN2022/129814
§ 371 (c)(1),
(2) Date: Nov. 15, 2022

(87) PCT Pub. No.: WO2024/065948
PCT Pub. Date: Apr. 4, 2024

(65) Prior Publication Data
US 2024/0219746 A1 Jul. 4, 2024

(30) Foreign Application Priority Data
Sep. 29, 2022 (CN) .......................... 202211203913.4

(51) Int. Cl.
*G02B 30/54* (2020.01)
*G09G 3/00* (2006.01)

(52) U.S. Cl.
CPC ............. *G02B 30/54* (2020.01); *G09G 3/001* (2013.01)

(58) Field of Classification Search
CPC ....... H04N 13/398; H04N 13/39; G02B 30/54
See application file for complete search history.

(56) References Cited

U.S. PATENT DOCUMENTS 10,969,666 B1 * 4/2021 Haseltine ............. H04N 9/3194
2002/0140631 A1 * 10/2002 Blundell ................ G09G 3/005
348/E13.056
(Continued)

FOREIGN PATENT DOCUMENTS

CN 101702058 A 5/2010
CN 101783966 A 7/2010
(Continued)

OTHER PUBLICATIONS

PCT International Search Report for International Application No. PCT/CN2022/129814, mailed on Jun. 5, 2023, 9pp.
(Continued)

*Primary Examiner* — Christopher Stanford
(74) *Attorney, Agent, or Firm* — The Roy Gross Law Firm, LLC; Roy D. Gross

(57) ABSTRACT

The application provides a display device and a display method of the display device. A plurality of display components and a plurality of optical components are installed on a rotating mechanism, wherein each of the optical components is located on a corresponding one of the display components, and each of the optical components is disposed obliquely with respect to the corresponding one of the display components. So that when the driving mechanism drives the rotating mechanism to move, the light emitted by the plurality of display components is projected into an imaging space outside the rotating mechanism through the
(Continued)

corresponding optical components to form a stereoscopic image.

19 Claims, 6 Drawing Sheets

(56) References Cited

U.S. PATENT DOCUMENTS

2008/0266523 A1 * 10/2008 Otsuka ................. H04N 13/363
                                                         348/E13.058
2023/0350223 A1 * 11/2023 Castleman ............. G09G 3/003

FOREIGN PATENT DOCUMENTS

| | | | |
|---|---|---|---|
| CN | 103969838 | A | 8/2014 |
| CN | 106597677 | A | 4/2017 |
| CN | 110364096 | A | 10/2019 |
| CN | 111158162 | A | 5/2020 |
| CN | 111447433 | A | 7/2020 |
| CN | 211979351 | U | 11/2020 |
| FR | 3039029 | A1 | 1/2017 |
| WO | 2021139204 | A1 | 7/2021 |

OTHER PUBLICATIONS

PCT Written Opinion of the International Searching Authority for International Application No. PCT/CN2022/129814, mailed on Jun. 5, 2023, 7pp.
Chinese Office Action issued in corresponding Chinese Patent Application No. 202211203913.4 dated Mar. 25, 2025, pp. 1-7, 14pp.

* cited by examiner

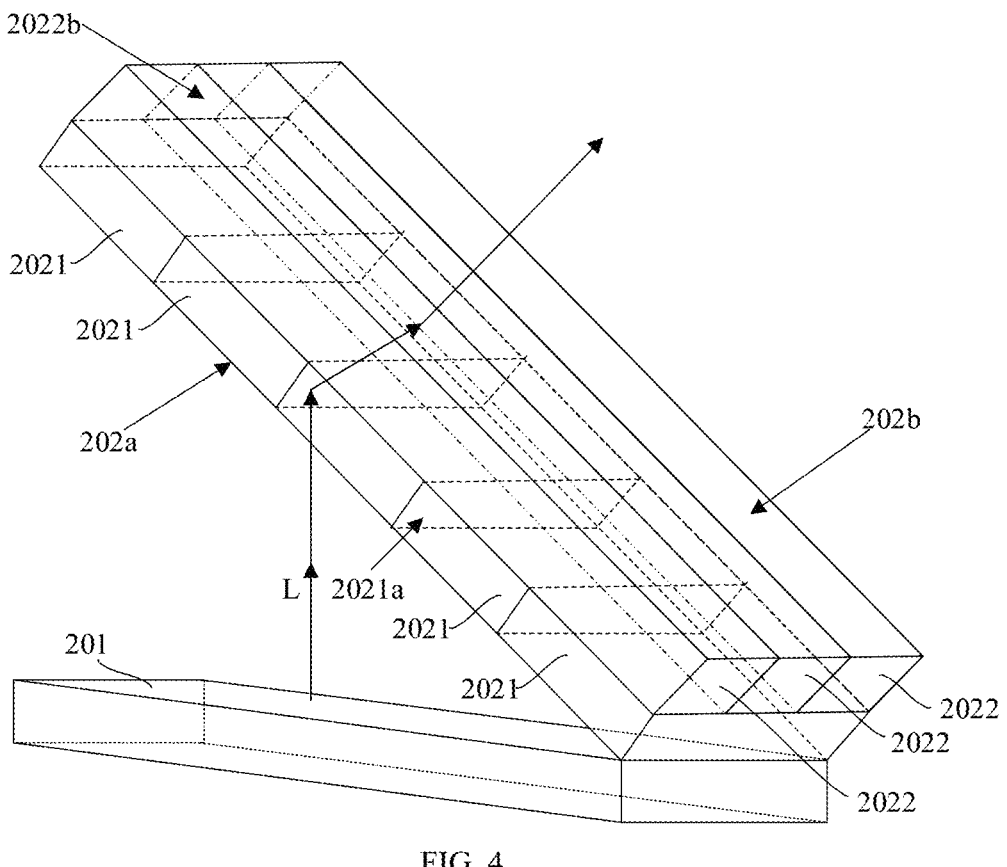

FIG. 4 receiving image information generating a rotation control signal and a plurality of display control signals according to the image information, wherein the rotation control signal is configured to drive the rotating mechanism to rotate around the axis, and the plurality of display control signals are configured to make the plurality of display components display corresponding image information when the plurality of display components rotate coaxially with the rotating mechanism to form the stereoscopic image

FIG. 5

DISPLAY DEVICE AND DISPLAY METHOD OF DISPLAY DEVICE

CROSS REFERENCE TO RELATED APPLICATIONS

This application is a National Phase of PCT Patent Application No. PCT/CN2022/129814 having International filing date of Nov. 4, 2022, which claims the benefit of priority of Chinese Application No. 202211203913.4 filed on Sep. 29, 2022. The contents of the above applications are all incorporated by reference as if fully set forth herein in their entirety.

FIELD OF INVENTION

The present application relates to a field of display technology, in particular, to a display device and a display method of the display device.

DESCRIPTION OF PRIOR ART

Three-dimensional stereoscopic display technology is considered to be a future development direction of display technology and has gradually become a development trend in the field of display technology. Current three-dimensional stereoscopic display technology has four categories: glasses-based stereoscopic, autostereoscopic display, holographic technology, and volumetric three-dimensional display.

The glasses-based stereoscopic and the autostereoscopic display both should adopt a method of parallax (that is, images provided to the left eye and the right eye respectively are slightly different, thereby deceive brains and make observers feel a three-dimensional stereoscopic display) to give people a feeling of the three-dimensional stereoscopic display. However, the three-dimensional stereoscopic scene constructed by artificially creating parallax is not natural. Therefore, the realization of three-dimensional stereoscopic display by means of parallax increases a mental burden of the observers. When viewing displayed contents for a long time, it will cause a headache for the observers. The holographic technology uses interference and diffraction of light waves to achieve three-dimensional stereoscopic display, but the current development progress is very slow. The volumetric three-dimensional display achieves three-dimensional stereoscopic display by visual persistence effect. Compared with the glasses-based stereoscopic, the autostereoscopic display, and the holographic technology, the volumetric three-dimensional display can achieve a real dynamic three-dimensional stereoscopic display effect. However, a static volumetric three-dimensional display has high cost and short life not suitable for commercial use. It's imaging space is directly related to a physical volume, so a miniaturization design cannot be realized. Further, a scanning volumetric three-dimensional technology realize the third-dimensional imaging by mechanical means. A combination of various mechanical motions has greater instability, and at a same time occupies a larger physical volume, which limits practical applications of the scanning volumetric three-dimensional technology. Therefore, how to develop a universal three-dimensional stereoscopic display device has become a key to a development of the display field.

SUMMARY

Embodiments of the present application provide a display device and a display method of the display device, which can provide a true three-dimensional image with a levitation effect and realize three-dimensional stereoscopic display.

One embodiment of the present application provides a display device, including a driving module and a display module; and wherein the driving module includes a driving mechanism and a rotating mechanism, the driving mechanism is rotatably connected to the rotating mechanism to drive the rotating mechanism to rotate around an axis;

the display module includes a plurality of display components and a plurality of optical components; the plurality of display components and the plurality of optical components are installed on the rotating mechanism to rotate coaxially with the rotating mechanism, and each of the optical components is located on a corresponding one of the display components and is disposed obliquely with respect to the corresponding one of the display components; and wherein the plurality of optical components are configured to project light emitted by corresponding display components into an imaging space located outside the rotating mechanism, and the rotating mechanism is configured to drive the plurality of optical components and the plurality of display components to rotate to carry the light projected into the imaging space by the plurality of optical components form a stereoscopic image in the imaging space.

Optionally, in some embodiments of the present application, the rotating mechanism includes a rotating bracket and a rotating shaft. A central axis of the rotating bracket is coincident with the axis, the rotating shaft is installed on the central axis of the rotating bracket, wherein the plurality of display components are disposed around the central axis and installed on the rotating bracket, each of the optical components is disposed obliquely with respect to the central axis, and the plurality of optical components are disposed around the central axis and installed between the rotating shaft and the rotating bracket.

Optionally, in some embodiments of the present application, the rotating bracket includes a first support surface, the rotating shaft is perpendicular to the first support surface, and the plurality of display components are located in the first support surface, wherein a sum of areas of the plurality of display components is less than or equal to an area of the first support surface.

Optionally, in some embodiments of the present application, the display module further includes a plurality of display brackets installed on the rotating bracket, wherein a center of each of the display brackets overlaps with the central axis of the rotating bracket, and each of the display brackets is provided with two of the display components on opposite sides relative to the center.

Optionally, in some embodiments of the present application, the first support surface is circular shaped, a quantity of the plurality of display brackets included in the display module is $n < \pi d^2/4LW$, and $n \geq 1$, where d is a diameter of the first support surface, L is a length of each of the display brackets, and W is a width of each of the display brackets.

Optionally, in some embodiments of the present application, the display module further includes a plurality of display brackets installed between the rotating bracket and the rotating shaft, wherein each of the display brackets is provided with one of the display components.

Optionally, in some embodiments of the present application, the first support surface is circular shaped, a quantity of the plurality of display brackets included in the display module is $n < \pi d^2/4PW$, and $n \geq 2$, where d is a diameter of the first support surface, and d≥2P; P is a length of each of the display brackets, and W is a width of each of the display brackets.

Optionally, in some embodiments of the present application, each of the optical components includes a light incident surface and a light outlet surface arranged oppositely to each other, and each of the optical components includes a first light control device and a second light control device, and wherein the first light control device includes a plurality of first sub-light control devices, each of the first sub-light control devices includes a first reflective surface perpendicular to the light incident surface, and a plurality of first reflective surfaces corresponding to the plurality of first sub-light control devices are parallel to each other. The second light control device is located on the first light control device, the second light control device includes a plurality of second sub-light control devices, each of the second sub-light control devices includes a second reflective surface perpendicular to the light outlet surface, and a plurality of second reflective surfaces corresponding to the plurality of second sub-light control devices are parallel to each other; and wherein the first light control device is configured to reflect the light emitted by the corresponding display components to the second reflective surfaces of the second light control device through the first reflective surfaces, the second light control device is configured to reflect the light emitted by the corresponding display components and reflected by the first reflective surfaces into the imaging space through the second reflective surfaces; reflectivities of the first reflective surfaces corresponding to at least two of the optical components are different, and/or reflectivities of the second reflective surfaces corresponding to at least two of the optical components are different.

Optionally, in some embodiments of the present application, distances between the axis and ends of the plurality of display components close to the axis are not equal.

Optionally, in some embodiments of the present application, the distances between the axis and the ends of the plurality of display components close to the axis are in equal proportion.

Optionally, in some embodiments of the present application, a first included angle is defined between each of the display components and corresponding one of the optical components is defined with a first included angle, and the first included angle is greater than or equal to 35 degrees and less than or equal to 55 degrees.

Optionally, in some embodiments of the present application, the first included angles between the plurality of display components and the plurality of optical components are not equal.

Optionally, in some embodiments of the present application, each of the display components includes a plurality of light-emitting devices arranged in a staggered manner, wherein distances between the plurality of light-emitting devices of the plurality of display components and the axis are not equal.

Optionally, in some embodiments of the present application, the display device further includes a display control module, the display control module is configured to analyze received display content to obtain image information corresponding to different positions in space and transmit the image information to the driving module.

Optionally, in some embodiments of the present application, the driving module further includes a mechanical driving controller, the mechanical driving controller is configured to generate a rotation control signal according to the image information, and the driving mechanism is configured to drive the rotating mechanism to rotate around the axis according to the rotation control signal.

Optionally, in some embodiments of the present application, the driving module further includes a display driving unit, the display driving unit is configured to generate a plurality of display control signals according to the image information, and the plurality of display components are configured to display corresponding image information when rotating coaxially with the rotating mechanism according to the plurality of display control signals.

Optionally, in some embodiments of the present application, the display content is a three-dimensional display content.

Optionally, in some embodiments of the present application, the rotating shaft is transparent.

The present application further provides a display method of a display device, applied to any of the above display devices, the display method of the display device includes steps:

receiving image information; and generating a rotation control signal and a plurality of display control signals according to the image information; wherein the rotation control signal is configured to drive the rotating mechanism to rotate around the axis, and the plurality of display control signals are configured to make the plurality of display components display corresponding image information when the plurality of display components rotate coaxially with the rotating mechanism to form the stereoscopic image.

Optionally, in some embodiments of the present application, the image information is obtained by analyzing a three-dimensional image, and the image information includes a plurality of position information and display information corresponding to the plurality of position information.

Compared with the prior art, the present application provides the display device and the display method of the display device. In the display device, the driving mechanism is rotatably connected to the rotating mechanism, so that the rotating mechanism can be driven to rotate around the axis by the driving mechanism. By installing the plurality of display components and the plurality of optical components on the rotating mechanism, wherein each of the optical components is located on a corresponding one of the display components, and each of the optical components is disposed obliquely with respect to the corresponding one of the display components, so that light emitted by the display components project into an imaging space located outside the rotating mechanism through the corresponding optical components, and so that when the rotating mechanism drives the plurality of optical components and the plurality of display components to rotate, the light projected into the imaging space through the plurality of optical components forms multi-layer images in the imaging space, and superposition of the multi-layer images forms a three-dimensional image to provide a true three-dimensional floating display effect. The display method of the display device is applied to the display device, including receiving image information, and generating the rotation control signal and the plurality of display control signals according to the image information, wherein the rotation control signal is configured to drive the rotating mechanism to rotate around the axis, and the plurality of display control signals are configured to make the plurality of display components display corresponding image information when the plurality of display components rotate coaxially with the rotating mechanism to form the stereoscopic image.

BRIEF DESCRIPTION OF DRAWINGS

FIG. 4 is a schematic structural diagram of an optical component in the embodiments of the present application.

FIG. 5 is a flowchart of a display method of the display device in the embodiments of the present application.

DETAILED DESCRIPTION OF EMBODIMENTS

In order to make objectives, technical solutions, and effects of the present application clear, the present application will be further described in detail below with reference to the accompanying drawings and examples. It should be understood that the specific embodiments described herein are only used to explain the present application and are not used to limit the present application.

Figure 1:
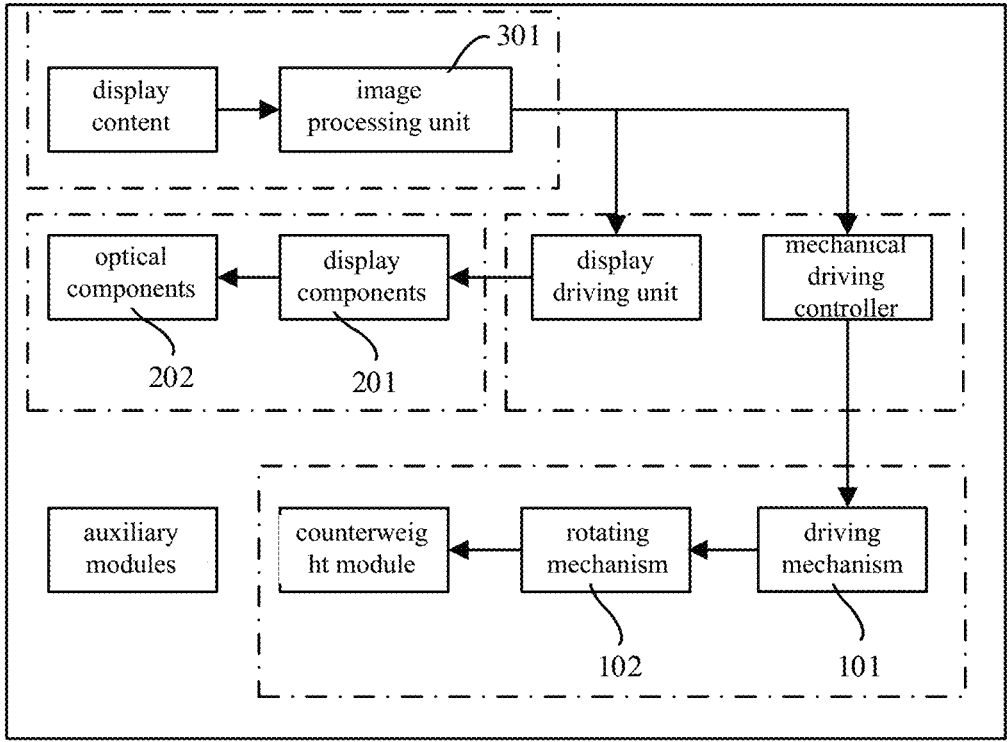
FIG. 1 is a system block diagram of a display device of the present application.
Figure 2A:
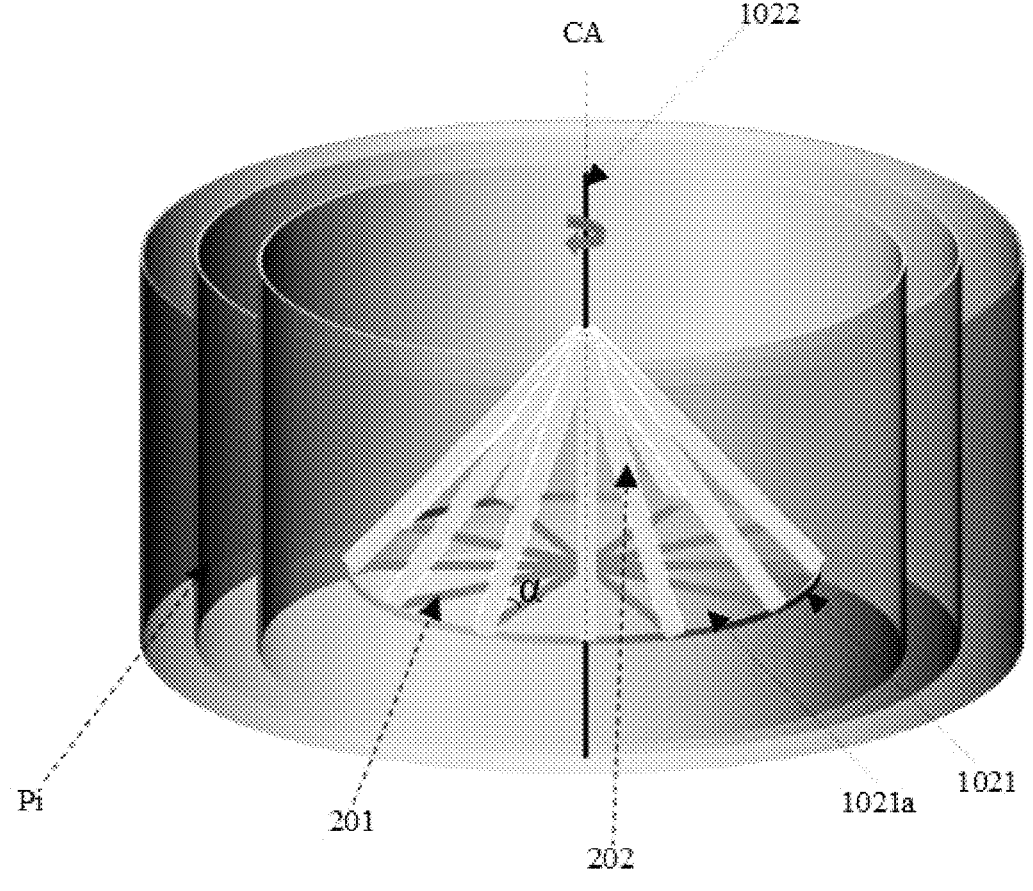
FIGS. 2A to 2B are schematic structural diagrams of the display device in embodiments of the present application.
Figure 2B:
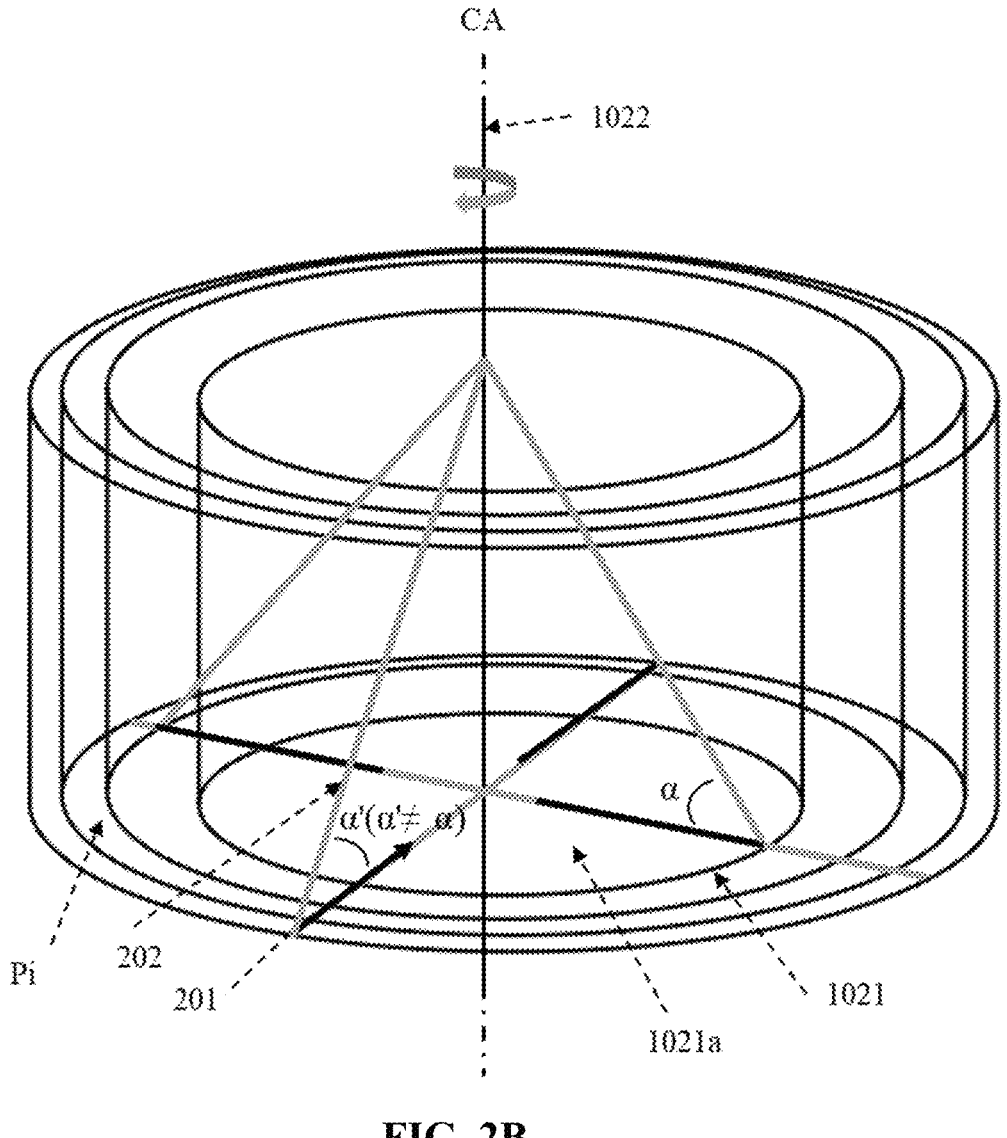

In detail, FIG. 1 is a system block diagram of a display device of the present application, and FIGS. 2A to 2B are schematic structural diagrams of the display device in embodiments of the present application. The present application provides a display device, including a driving module and a display module.

The driving module includes a driving mechanism 101 and a rotating mechanism 102. The driving mechanism 101 is rotatably connected to the rotating mechanism 102 to drive the rotating mechanism 102 to rotate around an axis CA.

The display module comprises a plurality of display components 201 and a plurality of optical components 202. The plurality of display components 201 and the plurality of optical components 202 are installed on the rotating mechanism 102 to rotate coaxially with the rotating mechanism 102. Each of the optical components 202 is located on a corresponding one of the display components 201 and is disposed obliquely with respect to the corresponding one of the display components 201.

The plurality of optical components 202 are configured to project light emitted by corresponding display components 201 into an imaging space located outside the rotating mechanism 102. The rotating mechanism 102 is configured to carry the plurality of optical components 202 and the plurality of display components 201 to rotate to make the light projected into the imaging space by the plurality of optical components 202 form multi-layer two-dimensional images Pi in the imaging space. Superposition of the multi-layer two-dimensional images Pi forms a three-dimensional image, so as to provide a true three-dimensional floating display effect.

Optionally, the driving mechanism 101 includes devices such as a motor.

Optionally, the rotating mechanism 102 includes a rotating bracket 1021 and a rotating shaft 1022. A central axis of the rotating bracket 1021 coincides with the axis CA. The rotating shaft 1022 is installed at the central axis of the rotating bracket 1021.

Optionally, the rotating bracket 1021 and the rotating shaft 1022 can be integrally formed. Optionally, the rotating bracket 1021 and the rotating shaft 1022 are connected by means of threads, grooves, protrusions, keys, pins, or the like. Optionally, a reliable connection is achieved between the rotating bracket 1021 and the rotating shaft 1022 through interference fit.

The plurality of display components 201 are disposed around the central axis CA of the rotating bracket 1021 and installed on the rotating bracket 1021. The plurality of optical components 202 are disposed around the central axis CA of the rotating bracket 1021 and installed between the rotating bracket 1021 and the rotating shaft 1022. So that each of the optical components 202 is disposed obliquely with respect to the central axis CA and the corresponding one of the display components 201.

By providing each of the optical components 202 disposed obliquely with respect to the central axis CA and the corresponding one of the display components 201, the plurality of optical components 202 can project the light emitted by the corresponding display components 201 into the imaging space located outside the rotating bracket 1021. So that when the rotating mechanism 102 drives the plurality of optical components 202 and the plurality of display components 201 installed on the rotating bracket 1021 to rotate, the light projected into the imaging space through the plurality of optical components 202 forms the multi-layer images in the imaging space. Superposition of the multi-layer images forms a three-dimensional image to provide a true three-dimensional floating display effect.

Optionally, the plurality of optical components 202 are in a one-to-one correspondence with the plurality of display components 201, so that the light emitted by each of the display components 201 is projected into the imaging space outside the rotating bracket 1021 through the corresponding one of the optical components 202. A layer of the two-dimensional images Pi is formed by driving of the rotating mechanism 102.

Optionally, an end of each of the optical components 202 connected to the rotating shaft 1022 is provided with a first connecting portion. The first connecting portion is connected to the rotating shaft 1022. Optionally, the first connecting portion is annular, so as to sleeve on the rotating shaft 1022.

Optionally, the rotating bracket 1021 is provided with a plurality of first grooves. An end of each of the optical components 202 connected to the rotating bracket 1021 can be provided with protrusion corresponding to the first grooves, so that connections between the optical components 202 and the rotating bracket 1021 is realized. Optionally, the rotating bracket 1021 and the optical components 202 can also be connected by means of threads, keys, pins, or the like.

Optionally, each of the display components 201 can be installed on the rotating bracket 1021 by means of glue, thread, key, pin, or the like. Optionally, the rotating bracket 1021 is provided with a plurality of second grooves, and the plurality of display components 201 are correspondingly located in the second grooves.

Optionally, the rotating bracket 1021 has a first support surface 1021*a*. The rotating shaft 1022 is perpendicular to the first supporting surface 1021*a*. The plurality of display components 201 are located on the first supporting surface 1021*a*. In order for the light emitted by each of the display components 201 to be projected into the imaging space by the corresponding one of the optical components 202, a sum of areas of the plurality of display components 201 is less than or equal to an area of the first support surface 1021*a*. So that the light emitted by the plurality of display components 201 is not blocked from each other to ensure that the light emitted by each of the display components 201 can be projected by the corresponding one of the optical components 202 to the imaging space thereby forms the two-dimensional images Pi in the imaging space.

Optionally, the first support surface 1021*a* is circular shaped. In addition, the first support surface 1021*a* can also be polygonal shaped, elliptical shaped, etc.

Figure 3A:
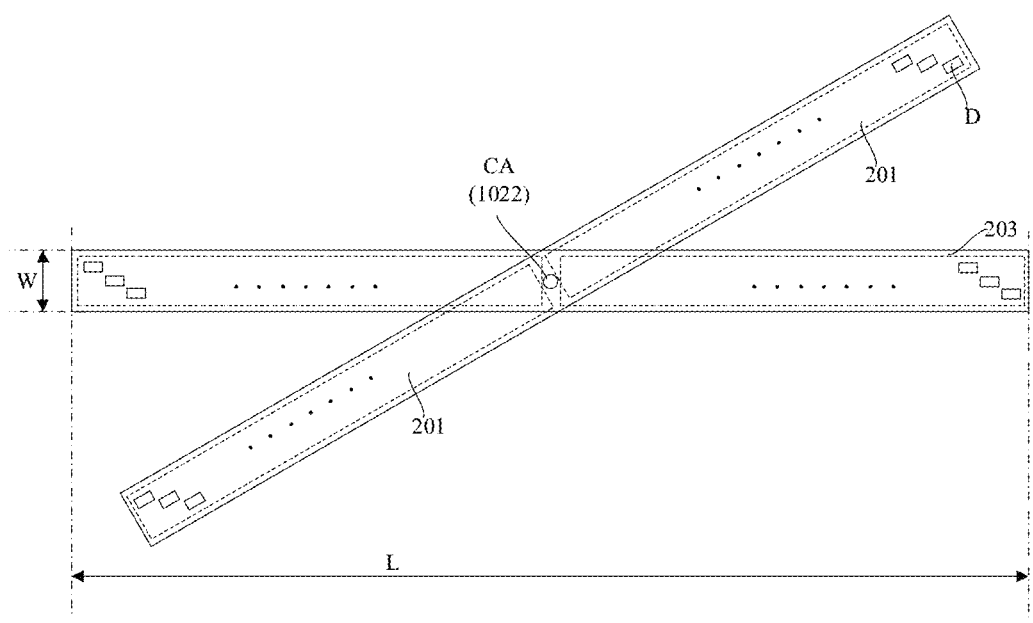
FIGS. 3A to 3C are schematic structural diagrams of a display component in the embodiments of the present application.
Figure 3B:
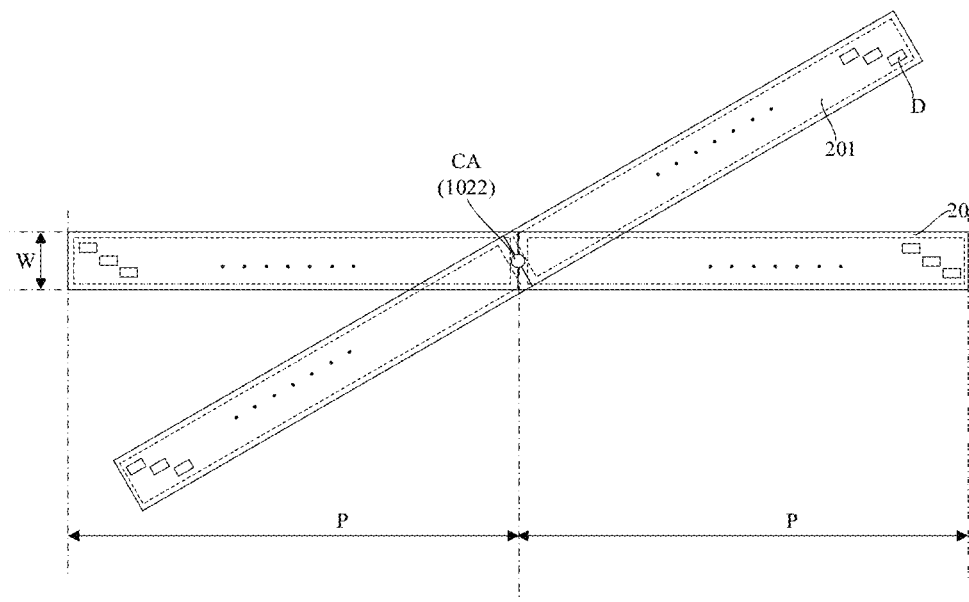
Figure 3C:
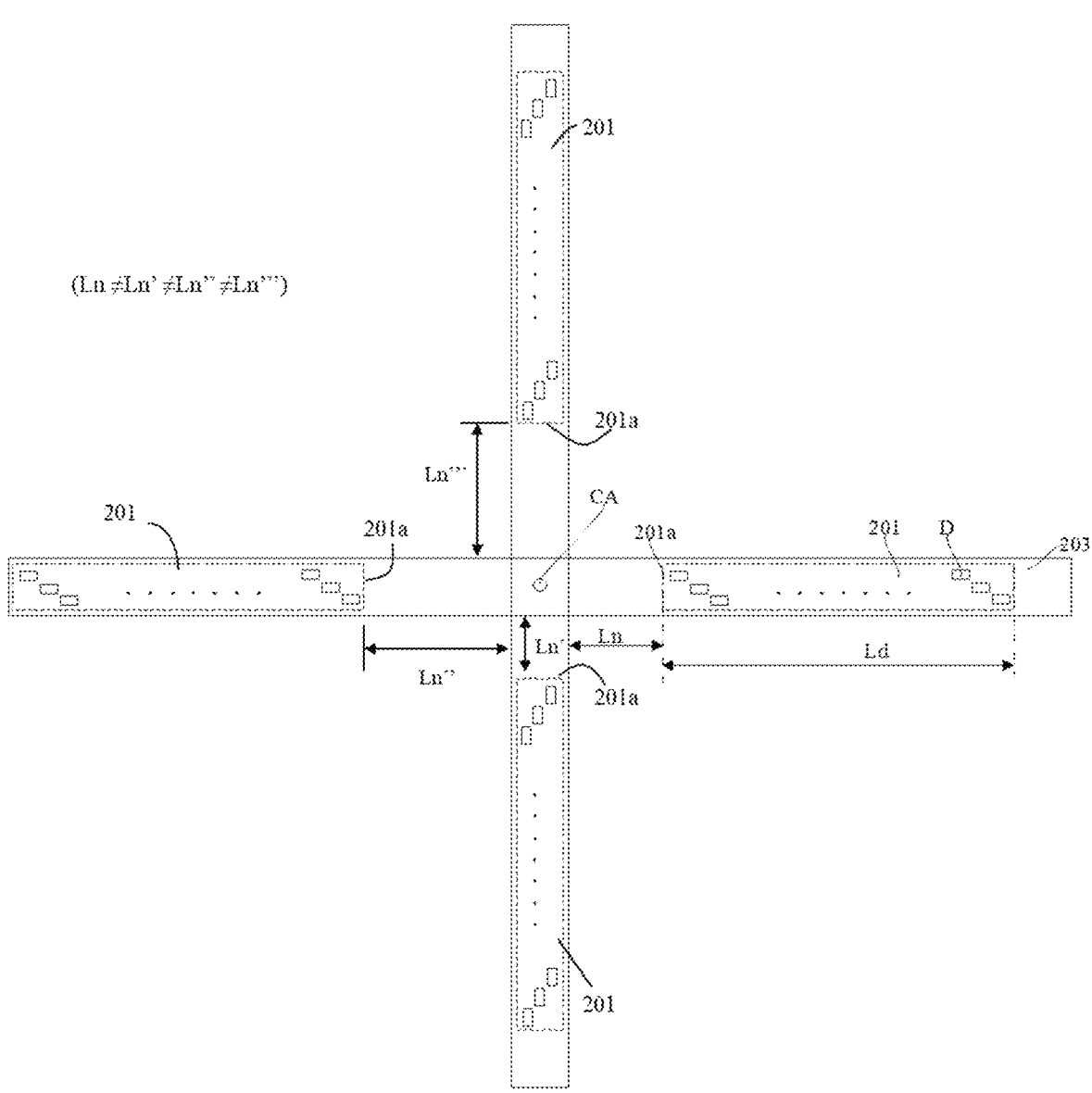

FIGS. 3A to 3C are schematic structural diagrams of a display component in the embodiments of the present application. Optionally, the display module further includes a plurality of display brackets 203. The plurality of display brackets 203 are installed on the rotating bracket 1021. The plurality of display components 201 are installed on the plurality of display brackets 203, so that the plurality of display components 201 can be installed on the rotating bracket 1021 through the plurality of display brackets 203.

Optionally, please continue to refer to FIG. 3A, a center of each of the display brackets 203 overlaps with the central axis of the rotating bracket 1021. Each of the display brackets 203 is provided with two of the display components 201 on opposite sides relative to the center.

Optionally, the rotating shaft 1022 passes through the center of each of the display brackets 203, so that the center of each of the display brackets 203 overlaps with the central axis of the rotating bracket 1021. Optionally, an opening is provided at the center of each of the display brackets 203. The rotating shaft 1022 passes through the opening and is fixedly connected to every display bracket 203 to carry the plurality of display brackets 203 to rotate when the rotating shaft 1022 rotates.

By disposing two of the display components 201 on opposite sides relative to the center of one of the display brackets 203, one of the display brackets 203 can correspond to two of the optical components 202, thereby saving a quantity of the display brackets 203.

Optionally, the first support surface 1021*a* is circular shaped. In an embodiment that the plurality of display components 201 are installed on the rotating bracket 1021 in a form of the display components 201 arranged on opposite sides relative to the center of one of the display brackets 203, a quantity of the display brackets 203 included in the display module is $n < \pi d_2/4LW$, and n≥1, wherein n is the quantity of the display brackets 203 included in the display module, d is a diameter of the first support surface 1021*a*, L is a length of each of the display brackets 203, and W is a width of each of the display brackets 203. So that a sum of areas of the plurality of display components 201 is less than or equal to an area of the first support surface 1021*a*.

Because each of the display components 201 corresponds to an optical components 202, in an embodiment that the quantity of the display brackets 203 included in the display module is n=1, the display module will include two display components 201, and correspondingly, the display module will also include the optical components corresponding to the two display components 201. Therefore, when the light emitted by the two display components 201 is projected into the imaging space through the corresponding optical components 202, multi-layer two-dimensional images can be formed, and thus a three-dimensional stereoscopic image can be formed by superimposing the multi-layer two-dimensional images.

Optionally, the diameter d of the first support surface 1021*a* can be greater than or equal to the length L of the display bracket 203, so that in an embodiment that the display bracket 203 is installed on the rotating bracket 1021, the display bracket 203 always located within the first support surface 1021*a*.

Optionally, please continue to refer to FIG. 3B, the plurality of display brackets 203 are installed between the rotating bracket 1021 and the rotating shaft 1022. Each of the display brackets 203 is provided with one of the display components 201.

Optionally, an end of each of the display brackets 203 connected to the rotating shaft 1022 is provided with a second connecting portion, and the second connecting portion is connected to the rotating shaft 1022. Optionally, the second connecting portion is circular-ring-like shaped, so as to sleeve on the rotating shaft 1022.

Optionally, the first support surface 1021*a* is circular shaped. In an embodiment that the plurality of display components 201 are installed on the rotating bracket 1021 in a form of one display component 201 disposed on one display bracket 203, a quantity of the display brackets 203 included in the display module is $n < \pi d^2/4PW$, and n≥2, wherein n is a quantity of the display brackets 203 included in the display module, d is a diameter of the first support surface 1021*a*, P is a length of each of the display brackets 203, and W is a width of each of the display brackets 203. So that a sum of areas of the plurality of display components 201 is less than or equal to an area of the first support surface 1021*a*.

Optionally, the diameter d of the first support surface 1021*a* is greater than or equal to twice the length P of each of the display bracket 203 (that is d≥2P), so as to prevent a sum of lengths of two of the display brackets 203 located on a same extension line from being greater than the diameter d of the first support surface 1021*a*, and the plurality of display brackets 203 can be located within the first support surface 1021*a*.

Optionally, the display module can include an even number of the display components 201 or can include an odd number of the display components 201. Optionally, in an embodiment that the display module includes an even number of the display components 201, it can be realized in a configuration that two display components 201 are disposed on one display bracket 203. Optionally, in an embodiment that the display module includes an odd number of the display components 201, it can be realized by a setting mode of two display components 201 disposed on one display bracket 203 incorporating with a setting mode of one display component 201 disposed on one display bracket 203 or by adopting solely the setting mode of one display component 201 disposed on one display bracket 203.

Optionally, each of the display brackets 203 can be installed on the rotating bracket 1021 by means of glue, thread, key, pin, or the like. Optionally, each of the display brackets 203 can also be disposed in the second groove on the rotating bracket 1021.

Please continue to refer to FIG. 3C, distances between the centers of the display components 201 and the center axis of the rotating bracket 1021 can be not equal, so as to change the distance of each of the display components 201 relative to the axis CA, thereby change spatial position of the two-dimensional image Pi in the imaging space projected by the light emitted by the display component 201 through the corresponding optical component 202.

Optionally, distances between the axis CA and ends 201*a* of the plurality of display components 201 close to the axis CA are not equal, so that when the light emitted by the display components 201 is projected into the imaging space through the optical components 202, distances between the two-dimensional images Pi formed by the light projected into the imaging space driven by the rotating mechanism and the axis CA are not equal. The distance between the two-dimensional image Pi formed in the imaging space by the light emitted by each of the display components 201 and projected through the corresponding optical component 202 and the axis CA is equal to a sum of a distance Ln between the axis CA and the end 201a of the display component 201 near the axis CA and a length Ld of the display component 201.

When displaying image, the plurality of display components 201 and the plurality of optical components 202 continuously rotate by the driving of the rotating mechanism 102. Each of the display components 201 displays different contents at different positions, and the different contents are projected into the imaging space through the corresponding optical components 202. A corresponding projection depth is the sum of the distance Ln between the axis CA and the end 201a of the display component 201 near the axis CA and the length Ld of the display component 201. By virtue of the visual persistence effect, different contents displayed by the plurality of display components 201 at different positions will be presented as continuous annular suspended images when being projected into the imaging space by the corresponding optical components 202, so as to form a plurality of two-dimensional images Pi. Because the spatial depths of the two-dimensional images Pi generated by the different display components 201 are different, when viewing the display device, multi-layer two-dimensional images Pi will be superimposed to form a complete suspended stereoscopic image.

It can be understood that, in a depth direction of the imaging space, a distance between each layer of the two-dimensional images Pi and the axis CA can be determined according to actual needs.

Optionally, in order to make a plurality of two-dimensional images Pi generated by projection of the plurality of display components 201 corresponding by optical components 202 uniformly arranged in the depth direction in the imaging space, the distances between the axis CA and the ends 201 of the plurality of display components close to the axis CA are in equal proportion. It can be understood that in some special display requirements, the distances between the axis CA and the ends 201a of the plurality of display components 201 near the axis CA can be designed not in equal proportion.

Please continue to refer to FIGS. 3A to 3C. Each of the display components 201 includes a plurality of light-emitting devices D arranged in a staggered manner. Distances between the plurality of light-emitting devices D of the plurality of display components 201 and the axis CA are not equal, so that when the plurality of display components 201 are rotating with the rotating mechanism 102, movement tracks of the plurality of light-emitting devices D in each of the display components 201 are not coincident, and the movement tracks of the plurality of light-emitting devices D in the plurality of display components 201 are not coincident. Thus, when the plurality of display components 201 are rotating with the rotating mechanism 102, the light emitted by the plurality of display components 201 and projected into the imaging space through the corresponding optical components 202 can mutually fill vacancies where no light-emitting unit is projected to, so that the display device can further improve the resolution of the display device under limitations of existing technical conditions.

Optionally, the light-emitting device D is one of a light-emitting diode, a liquid crystal display module, or the like.

Optionally, the light-emitting device D is one of an organic light-emitting diode, a sub-millimeter light-emitting diode, a micro light-emitting diode, a quantum dot light-emitting diode, or the like. Optionally, colors of the light emitted by the plurality of light-emitting devices D is one of red, green, blue, white, yellow, or the like.

Optionally, the optical component 202 is one of a transmission type suspension device, a reflection type suspension device, an inverse type suspension device, or the like. Optionally, the optical component 202 is one of a negative reflection lens, a cross reflection array, or the like. The plurality of optical components 202 are configured to project the light emitted by the plurality of display components 201 to different positions in the imaging space.

FIG. 4 is a schematic structural diagram of an optical component provided in the embodiments of the present application. Each of the optical components 202 has a light incident surface 202a and a light outlet surface 202b arranged oppositely to each other. Each of the optical components 202 includes a first light control device and a second light control device.

The first light control device includes a plurality of first sub-light control devices 2021. Each of the first sub-light control devices 2021 has a first reflective surface 2021a perpendicular to the light incident surface 202a, and a plurality of first reflective surfaces 2021a corresponding to the plurality of first sub-light control devices 2021 are parallel to each other.

The second light control device is located on the first light control device. The second light control device includes a plurality of second sub-light control devices 2022. Each of the second sub-light control devices 2022 has a second reflective surface 2022b perpendicular to the light outlet surface 202b, and a plurality of second reflective surfaces 2022b corresponding to the plurality of second sub-light control devices 2022 are parallel to each other.

The first light control device is configured to reflect the light L emitted by the corresponding display component 201 to the second reflective surface 2022b of the second light control device through the first reflective surface 2021a. The second light control device is configured to reflect the light L emitted by the corresponding display component 201 and reflected by the first reflective surface 2021a into the imaging space to convergent an image through the second reflective surface 2022b. Thus, the first light control device and the second light control device are driven by the rotating mechanism 102 to form the plurality of two-dimensional images in the imaging space.

Optionally, reflection performance of the plurality of optical components 202 on the light emitted by the display components 201 can be adjusted by changing structural parameters, optical parameters, etc. of the plurality of optical components 202, so as to adjust spatial positions of the plurality of two-dimensional images in the imaging space.

Optionally, reflectivities of the first reflective surface 2021a corresponding to at least two of the optical components 202 are different, and/or reflectivities of the second reflective surface 2022b corresponding to at least two of the optical components 202 are different, so that the light emitted by the plurality of display components 201 is projected into the imaging space through the corresponding optical components 202 to form at least two two-dimensional images.

Optionally, the spatial positions of the plurality of two-dimensional images in the imaging space can be adjusted by adjusting thickness and height of the plurality of first sub-light control devices 2021 and/or the plurality of second sub-light control devices 2022 in each of the optical components 202.

It can be understood that the structural parameters and the optical parameters corresponding to each of the optical components 202 can be determined according to the positions of the two-dimensional images to be generated.

Please continue to refer to FIGS. 2A to 2B, between each of the display components 201 and the corresponding one of the optical components 202 is defined with a first included angle α, and the first included angle α is greater than or equal to 0 degree and less than or equal to 90 degrees.

Optionally, to make the light emitted by the display components 201 be effectively projected by the optical components 202, the first included angle α is greater than or equal to 35 degrees and less than or equal to 55 degrees. Optionally, the first included angle α is equal to 35 degrees, 36 degrees, 37 degrees, 38 degrees, 39 degrees, 40 degrees, 41 degrees, 42 degrees, 43 degrees, 44 degrees, 45 degrees, 46 degrees, 47 degrees, 48 degrees, 49 degrees, 50 degrees, 51 degrees, 52 degrees, 53 degrees, 54 degrees, or 55 degrees.

Optionally, in order to make the spatial positions of the plurality of two-dimensional images Pi in the imaging space different, the first included angles α between the plurality of display components 201 and corresponding optical components 202 are not equal.

Optionally, the rotating shaft 1022 is transparent to reduce interference of the rotating shaft 1022 on display images when the display device displays.

Optionally, some embodiments provides no rotating shaft 1022. Instead, ends of the plurality of optical components 202 away from the rotating bracket 1021 can be connected together through a device such as a transparent connecting bolt, so that there is no rotating shaft 1022 provided between the ends of the optical components 202 away from the rotating bracket 1021 and the rotating bracket 1021, so as to improve display effect of the display device.

Optionally, the plurality of display components 201 can be located within a same horizontal plane. For example, the plurality of display components 201 are located within the first support surface 1021*a*. Optionally, the plurality of display components 201 can also be located within different horizontal planes. For example, the plurality of display components 201 are disposed in support surfaces located at different heights of the rotating bracket 1021. In one embodiment that the plurality of display components 201 are located within the same horizontal plane, structural parameters and optical parameters of the optical components 202 can be adjusted, and/or the first included angle α between the display components 201 and the corresponding optical components 202 can be adjusted, to adjust display positions of a plurality of two-dimensional images in the imaging space. In another embodiment that the plurality of display components 201 are located within different horizontal planes, the structural parameters and the optical parameters of the optical component 202 can be adjusted, and/or the first included angle α between the display component 201 and the corresponding optical component 202 can be adjusted, to adjust the display positions of the plurality of the two-dimensional images in the imaging space.

Please continue to refer to FIG. 1, the driving module further includes a mechanical driving control unit and a display driving control unit, wherein the mechanical driving control unit includes the driving mechanism 101 and the rotating mechanism 102. Optionally, the mechanical driving control unit can further include a mechanical driving controller. The mechanical driving controller receives analyzed image information corresponding to different positions to generate a rotation control signal and transmits the generated rotation control signal to the driving mechanism 101. The driving mechanism 101 drives the rotating mechanism 102 to rotate around the axis CA according to the rotation control signal. The display driving control unit includes a display driving unit, the display components 201, and the optical components 202. The display driving unit is configured to receive the analyzed image information corresponding to different positions to generate a plurality of display control signals, so as to display the corresponding image information to form the stereoscopic image when the plurality of display components 201 rotate coaxially with the rotating mechanism 102.

Optionally, the display driving unit includes a pixel driving circuit, a gate driving circuit, and the like. Display control of the plurality of light-emitting devices D of the plurality of display components 201 is realized by the display driving unit.

Optionally, the display device further includes a display control module, the display control module is configured to analyze the received display content according to a corresponding algorithm to obtain image information at different positions in the corresponding space and to transmit the image information at different positions to the driving module. Optionally, the display content is a three-dimensional display content. Optionally, the display control module includes an image processing unit 301, and the image processing unit 301 is configured to receive, process, and convert the display content to generate image information corresponding to different positions in space. Optionally, the image processing unit 301 can include an image receiving part, an image processing part, and a converting part. The image receiving part is configured to receive the display content. The image processing part and the converting part are configured to convert the received display content into image information corresponding to different positions in the space. Optionally, the image processing unit 301 includes a graphics processor or the like.

Optionally, the display device further includes an auxiliary module, and the auxiliary module includes but is not limited to a power supply module, an audio device, a Wi-Fi receiver, and the like.

Optionally, the rotating mechanism 102 further includes a counterweight model, a yoke mechanism, and the like.

The display device provided in the present application transmits the image information of different positions in the corresponding space to the driving module after analyzing the received display content according to the corresponding algorithm by the display control module, and then, the driving module controls the display module and the rotating mechanism to realize linkage control according to the rotation control signal and the plurality of display control signals generated from the image information. So that the light emitted by the plurality of display components at different rotating positions can be projected into the imaging space outside the rotating mechanism through the corresponding optical components to form multi-layer images in the imaging space. A three-dimensional image is form by visual persistence effect in cooperating with the superposition of the multi-layer images to provide a true three-dimensional floating display effect. In addition, because the present application provide a true three-dimensional image with a floating effect just by the mutual cooperation of the driving module and the display module, so mechanical complexity can be reduced, and issues of low reliability caused by complex mechanical structure bulky non-display structure, and the like can be avoided.

FIG. 5 is a flowchart of a display method of the display device provided in the embodiments of the present application. The present application further provide a display method of a display device, applied to any of the above-mentioned display devices. The display method of the display device comprises steps:

receiving image information; and generating a rotation control signal and a plurality of display control signals according to the image information, wherein the rotation control signal is configured to drive the rotating mechanism to rotate around the axis, and the plurality of display control signals are configured to make the plurality of display components display corresponding image information when the plurality of display components rotate coaxially with the rotating mechanism to form the stereoscopic image.

Optionally, a driving module can be used to receive the image information. Optionally, a mechanical driving controller can be used to receive the image information to generate the rotation control signal and transmit the generated rotation control signal to a driving mechanism, so that the driving mechanism drives the rotating mechanism to rotate around the axis. A display driving unit can be used to receive the image information to generate the plurality of display control signals, so that the plurality of display components display corresponding image information when they rotate coaxially with the rotating mechanism, so as to form the stereoscopic image.

Optionally, the image information is obtained by analyzing a three-dimensional image, and the image information includes a plurality of position information and display information corresponding to the plurality of position information.

Optionally, a display control module can be used to analyzing the three-dimensional image to generate the image information including the plurality of position information and display information corresponding to the plurality of position information.

Understandably, the display device is one of a portable display device (such as a notebook computer, a mobile phone), a fixed terminal (such as a desktop computer, a TV), a measurement device (such as a sports bracelet, a thermometer), and the like.

Specific examples are used herein to illustrate the principles and implementations of the present application. The descriptions of the above embodiments are only used to help understand the methods and core ideas of the present application, and the content of this specification should not be construed as limitations on the present application.

What is claimed is:

1. A display device, comprising:

a driving module, wherein the driving module comprises a driving mechanism and a rotating mechanism, the driving mechanism is rotatably connected to the rotating mechanism to drive the rotating mechanism to rotate around an axis; and a display module, wherein the display module comprises a plurality of display components and a plurality of optical components, the plurality of display components and the plurality of optical components are installed on the rotating mechanism to rotate coaxially with the rotating mechanism, and each of the optical components is located on a corresponding one of the display components and is disposed obliquely with respect to the corresponding one of the display components; and wherein the plurality of optical components are configured to project light emitted by corresponding display components into an imaging space located outside the rotating mechanism, and the rotating mechanism is configured to carry the plurality of optical components and the plurality of display components to rotate to make the light projected into the imaging space by the plurality of optical components form a stereoscopic image in the imaging space, wherein each of the optical components comprises a light incident surface and a light outlet surface arranged oppositely to each other, and each of the optical components further comprises:

a first light control device, wherein the first light control device comprises a plurality of first sub-light control devices, each of the first sub-light control devices comprises a first reflective surface perpendicular to the light incident surface, and a plurality of first reflective surfaces corresponding to the plurality of first sub-light control devices are parallel to each other; and a second light control device, wherein the second light control device is located on the first light control device, the second light control device comprises a plurality of second sub-light control devices, each of the second sub-light control devices comprises a second reflective surface perpendicular to the light outlet surface, and a plurality of second reflective surfaces corresponding to the plurality of second sub-light control devices are parallel to each other; and wherein the first light control device is configured to reflect the light emitted by corresponding display components to the second reflective surfaces of the second light control device through the first reflective surfaces, the second light control device is configured to reflect the light emitted by the corresponding display components and reflected by the first reflective surfaces into the imaging space through the second reflective surfaces, reflectivities of the first reflective surfaces corresponding to at least two of the optical components are different, and/or reflectivities of the second reflective surfaces corresponding to at least two of the optical components are different.

2. The display device according to claim 1, wherein the rotating mechanism comprises:

a rotating bracket, wherein a central axis of the rotating bracket is coincident with the axis; and a rotating shaft, wherein the rotating shaft is installed on the central axis of the rotating bracket; and wherein the plurality of display components are disposed around the central axis and installed on the rotating bracket, each of the optical components is disposed obliquely with respect to the central axis, and the plurality of optical components are disposed around the central axis and installed between the rotating shaft and the rotating bracket.

3. The display device according to claim 2, wherein the rotating bracket comprises a first support surface, the rotating shaft is disposed perpendicular to the first support surface, and the plurality of display components are located on the first support surface; and wherein a sum of areas of the plurality of display components is less than or equal to an area of the first support surface.

4. The display device according to claim 3, wherein the display module further comprises one or more display brackets installed on the rotating bracket; and wherein a center of each of the display brackets overlaps with the central axis of the rotating bracket, and each of the display brackets is provided with two of the display components on opposite sides relative to the center.

5. The display device according to claim 4, wherein the first support surface is circular shaped, a quantity of the one or more display brackets comprised in the display module is $n < \pi d^2/4LW$, and $n \geq 1$, where d is a diameter of the first support surface, L is a length of each of the display brackets, and W is a width of each of the display brackets.

6. The display device according to claim 3, wherein the display module further comprises a plurality of display brackets installed between the rotating bracket and the rotating shaft; and wherein each of the display brackets is provided with one of the display components.

7. The display device according to claim 6, wherein the first support surface is circular shaped, a quantity of the plurality of display brackets comprised in the display module is $n < \pi d^2/4$ PW and $n \geq 2$, where d is a diameter of the first support surface, and $d \geq 2P$; P is a length of each of the display brackets, and W is a width of each of the display brackets.

8. The display device according to claim 2, wherein the rotating shaft is transparent.

9. The display device according to claim 1, wherein distances between the axis and ends of the plurality of display components close to the axis are not equal.

10. The display device according to claim 9, wherein the distances between the axis and the ends of the plurality of display components close to the axis are in equal proportion.

11. The display device according to claim 1, wherein between each of the display components and corresponding one of the optical components is defined with a first included angle, so that a plurality of first included angles are respectively formed between the plurality of display components and the plurality of optical components, and the first included angle is greater than or equal to 35 degrees and less than or equal to 55 degrees.

12. The display device according to claim 11, wherein the first included angles between the plurality of display components and the plurality of optical components are not equal.

13. The display device according to claim 1, wherein each of the display components comprises a plurality of light-emitting devices arranged in a staggered manner; and wherein distances between the plurality of light-emitting devices of the plurality of display components and the axis are not equal.

14. The display device according to claim 1, wherein the display device further comprises:

a display control module, wherein the display control module is configured to analyze received display content to obtain image information corresponding to different positions in space, and transmit the image information to the driving module.

15. The display device according to claim 14, wherein the driving module further comprises:

a mechanical driving controller, wherein the mechanical driving controller is configured to generate a rotation control signal according to the image information, and the driving mechanism is configured to drive the rotating mechanism to rotate around the axis according to the rotation control signal.

16. The display device according to claim 14, wherein the driving module further comprises:

a display driving unit, wherein the display driving unit is configured to generate a plurality of display control signals according to the image information, and the plurality of display components are configured to display corresponding image information when rotating coaxially with the rotating mechanism according to the plurality of display control signals.

17. The display device according to claim 14, wherein the display content is a three-dimensional display content.

18. A display method of a display device, applied to a display device, comprising:

a driving module, wherein the driving module comprises a driving mechanism and a rotating mechanism, the driving mechanism is rotatably connected to the rotating mechanism to drive the rotating mechanism to rotate around an axis; and a display module, wherein the display module comprises a plurality of display components and a plurality of optical components, the plurality of display components and the plurality of optical components are installed on the rotating mechanism to rotate coaxially with the rotating mechanism, and each of the optical components is located on a corresponding one of the display components and is disposed obliquely with respect to the corresponding one of the display components; and wherein the plurality of optical components are configured to project light emitted by corresponding display components into an imaging space located outside the rotating mechanism, and the rotating mechanism is configured to carry the plurality of optical components and the plurality of display components to rotate to make the light projected into the imaging space by the plurality of optical components form a stereoscopic image in the imaging space, wherein each of the optical components comprises a light incident surface and a light outlet surface arranged oppositely to each other, and each of the optical components further comprises:

a first light control device, wherein the first light control device comprises a plurality of first sub-light control devices, each of the first sub-light control devices comprises a first reflective surface perpendicular to the light incident surface, and a plurality of first reflective surfaces corresponding to the plurality of first sub-light control devices are parallel to each other; and a second light control device, wherein the second light control device is located on the first light control device, the second light control device comprises a plurality of second sub-light control devices, each of the second sub-light control devices comprises a second reflective surface perpendicular to the light outlet surface, and a plurality of second reflective surfaces corresponding to the plurality of second sub-light control devices are parallel to each other; and wherein the first light control device is configured to reflect the light emitted by corresponding display components to the second reflective surfaces of the second light control device through the first reflective surfaces, the second light control device is configured to reflect the light emitted by the corresponding display components and reflected by the first reflective surfaces into the imaging space through the second reflective surfaces, reflectivities of the first reflective surfaces corresponding to at least two of the optical components are different, and/or reflectivities of the second reflective surfaces corresponding to at least two of the optical components are different;

wherein the display method of the display device comprises:

receiving image information; and generating a rotation control signal and a plurality of display control signals according to the image information, wherein the rotation control signal is configured to drive the rotating mechanism to rotate around the axis, and the plurality of display control signals are configured to make the plurality of display components display corresponding image information when the plurality of display components rotate coaxially with the rotating mechanism to form the stereoscopic image.

19. The display method of the display device according to claim 18, wherein the image information is obtained by analyzing a three-dimensional image, and the image information comprises a plurality of position information and display information corresponding to the plurality of position information.

* * * * *